United States Patent
Von Arx

[15] 3,656,391
[45] Apr. 18, 1972

[54] SHEARING APPARATUS WITH WORKPIECE-VIEWING MEANS

[72] Inventor: Paul Von Arx, Gelterkinderstrasse 31, ch 4450, Sissach, Switzerland

[22] Filed: Feb. 20, 1970

[21] Appl. No.: 13,081

[30] Foreign Application Priority Data

Jan. 19, 1970 Switzerland ..............................668/70
Feb. 26, 1969 Switzerland ..............................3119/69

[52] U.S. Cl. ...................................................................83/521
[51] Int. Cl. ...............................................................B26d 7/00
[58] Field of Search..........................83/521, 520; 143/168 B

[56] References Cited

UNITED STATES PATENTS

| | | | |
|---|---|---|---|
| 2,380,267 | 7/1945 | Ruth.........................................| 83/521 |
| 3,034,388 | 5/1962 | Stoothhoff et al. ..................| 83/521 X |
| 3,304,834 | 2/1967 | Ollfisch et al.........................| 83/521 X |
| 2,911,884 | 11/1959 | Caudle et al. ........................| 83/520 X |

FOREIGN PATENTS OR APPLICATIONS 576,659 5/1933 Germany..............................83/521
548,552 4/1932 Germany..............................83/520

Primary Examiner—James M. Meister
Attorney—Karl F. Ross

[57] ABSTRACT

A shearing apparatus wherein a portion of a workpiece which projects over a table edge is sheared off by a generally vertically reciprocable blade while the workpiece is held firmly against the table by a clamping element. A viewer affords the operator an enlarged view of the workpiece in the gap between the clamping element and the blade. The viewer has a high-intensity light source which directs a beam of light at the workpiece in the gap and a reflector and lens arranged to direct to the operator the light reflected by the workpiece. A translucent screen can be provided to afford the operator a picture-like view regardless of his position.

9 Claims, 5 Drawing Figures

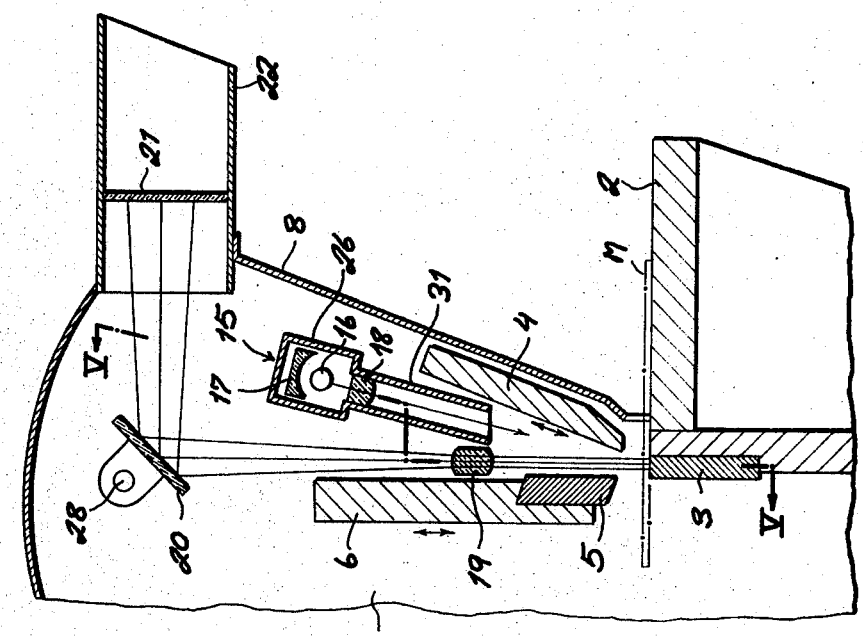
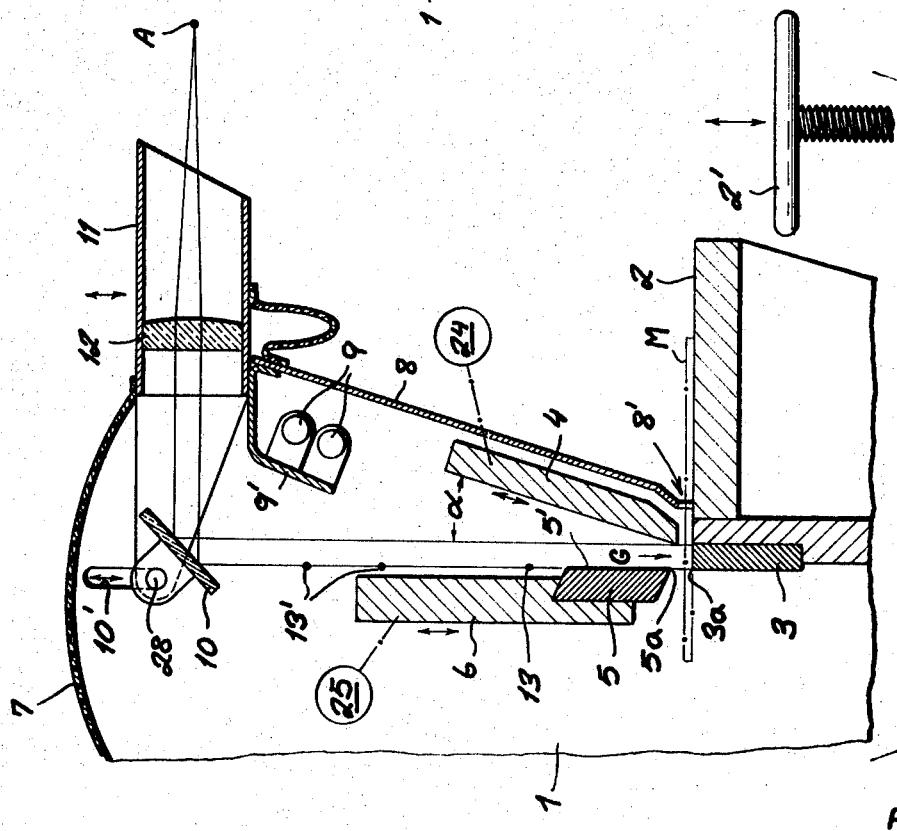
Paul Von Arx
INVENTOR.
BY Karl J. Ross
Attorney

SHEARING APPARATUS WITH WORKPIECE-VIEWING MEANS

The present invention relates to a shearing apparatus. More particularly, this invention relates to such an apparatus as is used in manufacturing shops to cut metal plates or other similar heavy sheet-like material.

Such devices have a table on which the workpiece to be cut is positioned with the portion to be cut off projecting beyond the table edge away from the operator. A clamping element or shoe is pressed against the workpiece when it has been properly positioned, and a heavy blade drops to shear the projecting portion substantially flush with the table edge.

For normal rough work an apparatus of this type is quite adequate and, when a great many similar cuts must be made, a stop is often provided so that the workpiece need merely be pushed against this stop to make the same cut every time.

As a matter of fact, it is practically impossible to cut accurately with such an apparatus when the cut must be made at a mark on the workpiece because the operator finds it extremely difficult to see just how the workpiece is positioned under the blade. The clamping element, even in the up position, partially obstructs the workpiece, and in the down position thoroughly blocks the view. The apparatus is usually provided in a closed housing so that any flying chips or splinters produced by the shearing operation cannot injure the operator. Even when the housing is not fully closed and some light is directed on the workpiece adjacent the blade, this area must be viewed from above and from a distance causing inconvenience and loss of accuracy.

In another improved method of the prior art, a light beam is directed directly in line with the blade so that a shadow is cast which coincides perfectly with the place where the blade will strike and cut the workpiece. This is useful with printed circuits and name plates. Nonetheless, it is still necessary that the operator somehow, by peering in the feed slot or down into the machine, get a look at just where the blade shadow falls. This is very difficult and none too accurate.

It is, therefore, an object of the present invention to provide an improved shearing apparatus which overcomes the above-mentioned drawbacks.

Another object of this invention is to provide a shear capable of convenient operation at high accuracy.

Yet another object of the present invention is to provide a shearing apparatus that permits simple, strainless and accurate viewing of the cutting area by the operator prior to and during each cut.

These objects are attained, in accordance with the invention, with a shearing apparatus having viewing means including a light source directing a light beam upon the marked surface of a workpiece in the gap between the blade and the clamping element. A reflector above the table collects light reflected by the workpiece from the beam to provide the operator with a view of the workpiece in the gap. Both the light source and the reflector are arranged between the planes of the clamping element and the blade so that the workpiece can be observed easily when the light is reflected out horizontally to eliminate any necessity of movement by the operator from his position in front of the loading slot of the apparatus.

According to another feature of this invention, the viewing means or optical path includes lenses which enlarge the image so that the operator can very accurately see and position the workpiece. Further guide means, such as a horizontal thread coplanar with the blade or a pair of vertically spaced horizontal threads lying in a vertical plane in line with the blade serve to judge very exactly where the cut will be made, even when the clamping element is down. With a single thread the position of the eye of the viewer may cause inaccuracies, the use of two threads permits alignment with greater precision.

In accordance with a further feature of the present invention, the enlarged image of the cut region is projected on a screen so that the operator will not have to move his head around to see just how the blade and the workpiece are lined up. This screen is advantageously tinted to eliminate any harsh reflections from the usually metallic workpiece.

The above and other objects, features and advantages will become apparent from the following description, reference being made to the accompanying drawing, in which:

FIG. 1 is a vertical sectional view of a first embodiment of the apparatus according to the present invention;

FIG. 2 is a similar view of a second embodiment of the apparatus according to the present invention;

Figure 5:
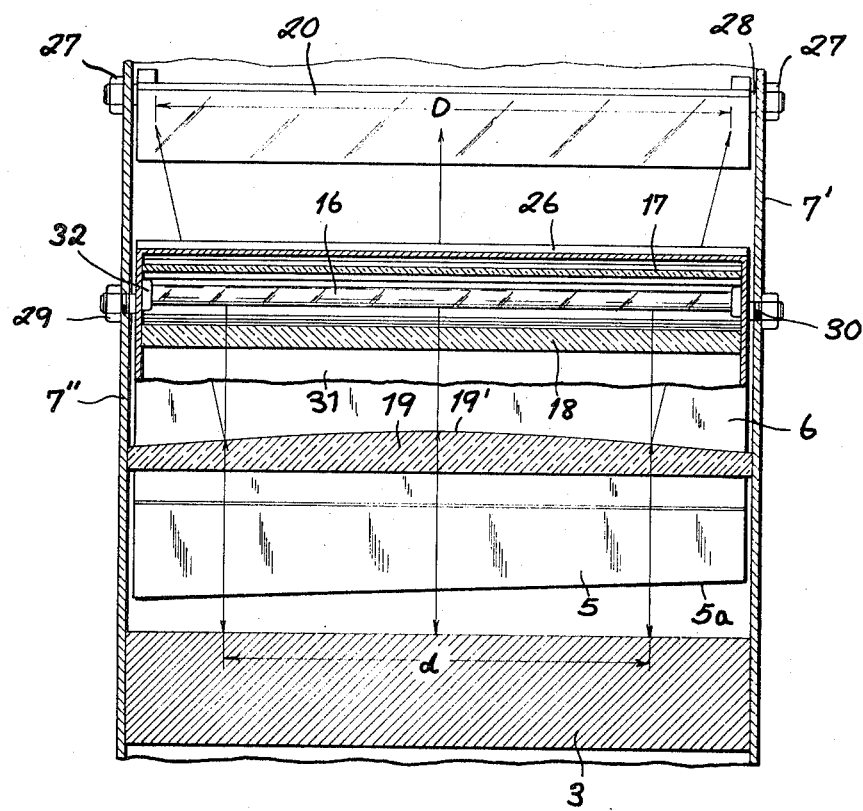
FIG. 5 is a section taken along line V—V of FIG. 2.

As seen in FIG. 1, the apparatus has a housing 1 provided with a table 2 having a reinforcing edge member 3. A workpiece M can be clamped to the table 2 by a clamping element 4 to have the portion of it which projects over the edge 3 cut off by a blade 5 carried on a vertically reciprocable beam 6. The clamping element 4 is elongated and flat and extends at an angle $\alpha$ of 15°–20°, preferably about 17°, to the vertical. A hydraulic actuating arrangement shown schematically at 24 is operable to move the element 4 downwardly, it being spring-biased into the illustrated up position. The beam 6 and blade 5 are similarly elongated and flat and extend vertically, as does the edge 3 of the table 2. As shown in FIG. 5, the cutting edge 5a of the blade 5 is inclined to the cutting edge 3a of the edge member 3 to facilitate shearing. A hydraulic actuating device 25 displaces the beam 6 downwardly as does the device 24.

The housing has side plates 7' and 7", a top cover plate 7, and a front plate 8 which serve to protect the operator from chips and keep stray light from falling on the workpiece in the gap G between the elements 4 and 5. Mounted via a bracket to this plate 8 are a pair of elongated high-intensity lamps 9 which direct a strong light beam on the workpiece in the gap G. The reflected light from the workpiece is picked up and reflected by a rotatably adjustable mirror 10 through a magnifying lens 12 held in a tube 11. This plano-convex lens 12 is a bar lens which focuses on a point A. Lining the blade surface 5' up with the line on the workpiece which is to be cut is aided by a horizontal thread 13 coplanar with the blades. Instead of this single thread, a pair of horizontal threads shown at the dots 13' can be used. In this latter case the two threads or filaments are lined up one over the other by shifting the operator's head, by positioning the operator with respect to the viewer by raising or lowering the seat 2', or by vertically shifting the viewer assembly 10, 11, 12 in a guide 10', and the line on the workpiece M to be cut is moved under the single line formed thereby. With a single thread 13 the operator positions his eye so that the thread appears in line with the blade and lines up the mark on the workpiece therewith. Vertical threads may be used, in which case, when the viewer is properly positioned, they appear as dots and permit lining the marking on the workpiece up thereunder. Then the operator need only actuate the devices 24 and 25 to cut off accurately the projecting workpiece end. In this embodiment the image is a magnified virtual image lying in an image plane beyond the mirror.

The reference numerals of FIG. 1 appearing in FIGS. 2 and 5 apply to functionally identical structure wherever they appear. In the second embodiment of FIG. 2 there is provided a light source 15 consisting of an elongated housing 26 in which is mounted a lamp 16 whose ends are received in sockets 32 with a reflector 17. The housing 26 is mounted on pins 30 passing through side walls 7' and 7" of the housing and carrying nuts 29 which can be tightened to hold the housing 26 in any angular position. A narrow portion 31 of the housing 26 holds plano-convex bar lens 18 which serves to focus the light of lamp 16 on the gap G. The reflected light passes through a biconvex beam lens 19 whence it is reflected by a mirror 20 mounted on pins 28 carrying tightening nuts 27 onto a translucent screen 21 mounted in a viewing tube 22 which keeps stray light off this screen 21.

FIG. 5 also shows a double-headed arrow indicating a distance $d$ which is equal to the width of the feed slot 8' (see FIG. 1). Also, the lens 19 is shown with an upper surface 19' curved in two dimensions so that it will enlarge the workpiece image in two dimensions to give the projection seen by the operator on the screen 21 a width D which is greater than the maximum workpiece width $d$. The workpiece is seen enlarged in two dimensions so that delicate positioning of, for example, printed circuit boards is easily carried out. As in the embodiment of FIG. 1, the picture seen by the operator is an upright virtual image.

This embodiment is used the same as that of FIG. 1, except that with it there is no problem with the position of the operator's head since the nuts 27 and 29 are adjustable to line the image up correctly on the screen 21. As in the previous embodiment, the image seen by the operator is enlarged.

Figures 3, 4:
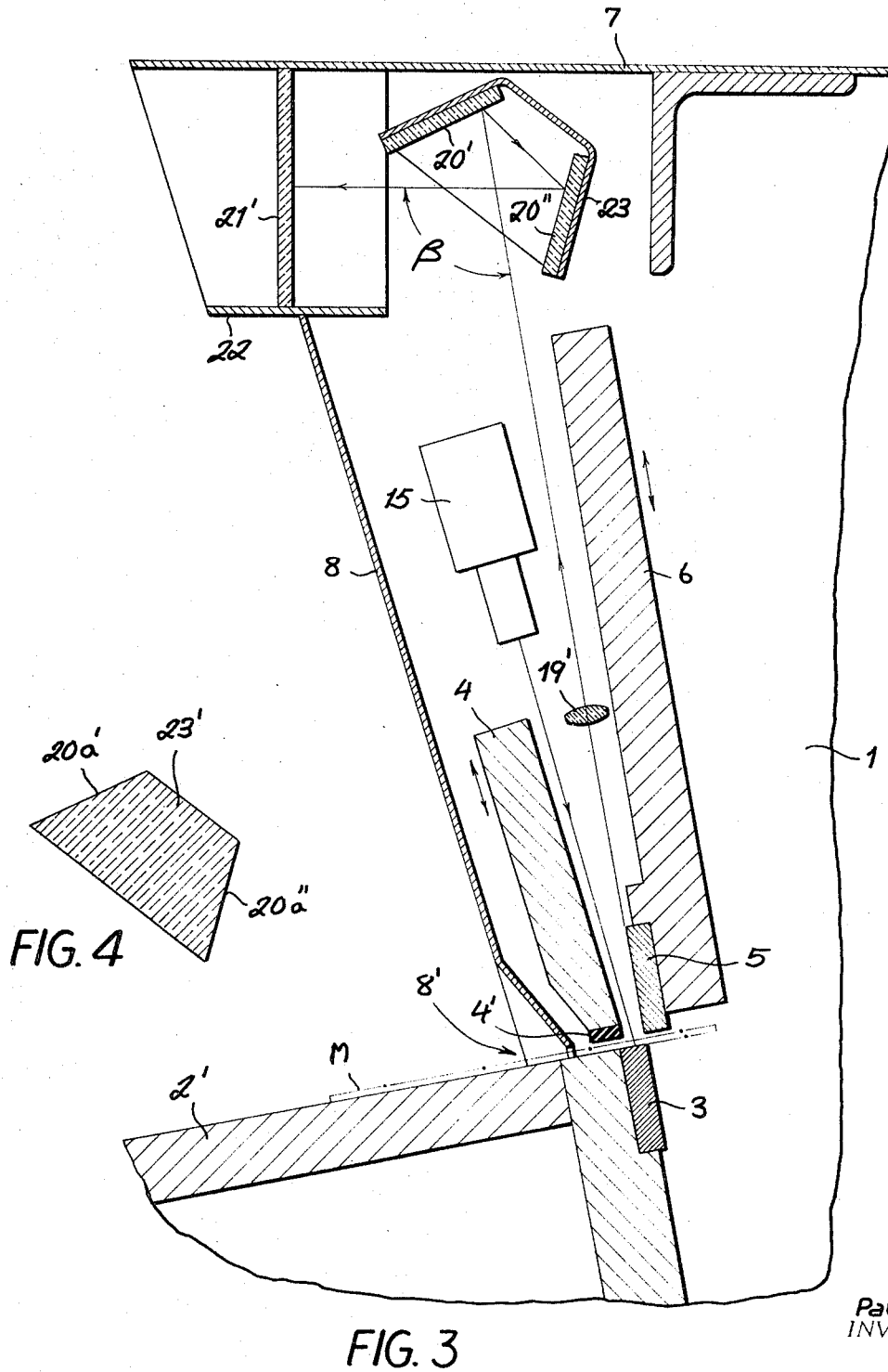
FIG. 3 is a side sectional view of a third embodiment of the apparatus of this invention.
FIG. 4 is a detail view of an alternative form of FIG. 3.

FIG. 3 shows a third embodiment which is identical with that of FIGS. 2 and 5 except that the table 2' is inclined relative to the horizontal, thereby making it easier for the operator, and there is provided a channel carrying a pair of mirrors 20' and 20'' instead of the single mirror 20 to reflect the light on a screen 21'. The screen 21' is tinted so that any harsh or harmful reflections are muted and do not irritate the operator. Furthermore, the clamping beam 4 is here provided with a rubber foot 4' to prevent marring of the workpiece M. In FIGS. 1 and 2 the light reflected from the workpiece is further reflected through 90°, FIG. 3 shows how a greater angle $\beta$ is possible between the reflected beam and viewing axis.

FIG. 4 shows a pentaprism 23' which has a pair of polished faces 20a' and 20a'' which can be used in the place of the channel 23 and mirrors 20' and 20''.

The apparatus shown in FIG. 3 is extremely easy to operate. The operator need merely feed the workpieces M in the slot 8' and observe in the screen 21' when the desired marking appears in line under the blade 5. Then the clamp actuator 24 is operated, usually by a pedal, and, if this has not moved the workpiece out of line, the actuator 25 is actuated, usually by another pedal, to cut off the workpiece end. The slot 8' is so narrow that fingers cannot be placed in danger under either of the elements 4 or 5, another feature rarely provided in prior-art devices since the workpiece must be viewed through the feed slot 8'.

It is worth noting that the light from the source 9 or 15 never falls directly on the reflector 10, 20, 20' and 20'', or 23', shielding in the form of the housing 26 or bracket 9' being provided in all cases. In general the reflected beam from the workpiece parallel to the movable blade is collected by the reflecting means and further reflected at least once along an optical axis transverse to this plane.

I claim:

1. A shear comprising:
   a table having a table edge and adapted to receive a workpiece resting on said table with a portion projecting beyond said edge;
   blade means rectilinearly reciprocal above said table and having a cutting edge cooperating with said edge for movement in a blade plane for shearing said portion off said workpiece; and
   viewing means including a light source directing a light beam against said workpiece at said table edge and a reflector above said table in said blade plane for directing light reflected along said plane by said workpiece from said beam to an operator for affording a view of the precise location on said workpiece to be engaged by said cutting edge on shearing off of said portion.

2. The shear defined in claim 1, further comprising clamping means including a clamping element adjacent said blade defining a gap therewith and engageable with said workpiece for holding same against said table during shearing, said beam being directed against workpiece in said gap.

3. The apparatus defined in claim 2 wherein said viewing means includes at least one lens in the path of the reflected light for affording said operator with an enlarged view of said workpiece in said gap.

4. The apparatus defined in claim 3 wherein said viewing means includes at least one filament in said plan.

5. The apparatus defined in claim 3 wherein said viewing means includes a screen, said reflector reflecting light onto said screen to afford said view.

6. The apparatus defined in claim 3 wherein said reflector has at least two flat reflecting surfaces.

7. The apparatus defined in claim 6 wherein said reflector is a prism.

8. The apparatus defined in claim 2 wherein said clamping element is displaceable in a plane inclined to said blade means.

9. The apparatus defined in claim 2 wherein said blade means includes a vertically displaceable elongated blade, said clamping element being elongated and displaceable toward and away from said table in a plane inclined to said blade plane and to said table, said viewing means including lens means including at least one bar lens for affording said operator with an enlarged view of said workpiece in said gap and an elongated lamp, said reflector being arranged and constructed to reflect the light reflected by said workpiece substantially horizontally toward said operator.

* * * * *